United States Patent [19]

Joseph et al.

[11] 4,001,114
[45] Jan. 4, 1977

[54] WASTE WATER TREATMENT PROCESS

[75] Inventors: Joel J. Joseph, Lakewood, Ohio;
John R. Keigher, Plainfield, Ill.

[73] Assignee: SCM Corporation, New York, N.Y.

[22] Filed: May 19, 1975

[21] Appl. No.: 578,829

[52] U.S. Cl. .............................. 210/44; 210/73 W
[51] Int. Cl.² ........................................ B01D 17/02
[58] Field of Search ........... 210/44, 23, 221 P, 259, 210/195 R, 730 W

[56] References Cited

UNITED STATES PATENTS

| | | | |
|---|---|---|---|
| 1,807,833 | 6/1931 | Eddy | 210/33 X |
| 1,947,709 | 2/1934 | Garrison et al. | 210/23 X |
| 2,217,143 | 10/1940 | Stevenson | 210/44 |
| 3,192,155 | 6/1965 | Bready et al. | 210/221 X |
| 3,259,567 | 7/1966 | Dunning et al. | 210/259 X |
| 3,419,493 | 12/1968 | Pangle, Jr. | 210/44 |
| 3,707,464 | 12/1972 | Burns et al. | 210/44 |

Primary Examiner—Frank A. Spear, Jr.
Attorney, Agent, or Firm—Jerry K. Mueller, Jr.

[57] ABSTRACT

Waste water feed contaminated with fatty residue and a recycle of froth from a later stage of the process are acidulated; the resulting less dense oil phase is separated from the remaining denser aqueous phase; the pH of the latter then is raised to at least about 6 and it subjected to a dissolved air flotation operation for producing (a) a froth for recycle into admixture with said waste water feed, and (b) a treated water underflow substantially free of initial fatty residue content.

4 Claims, 1 Drawing Figure

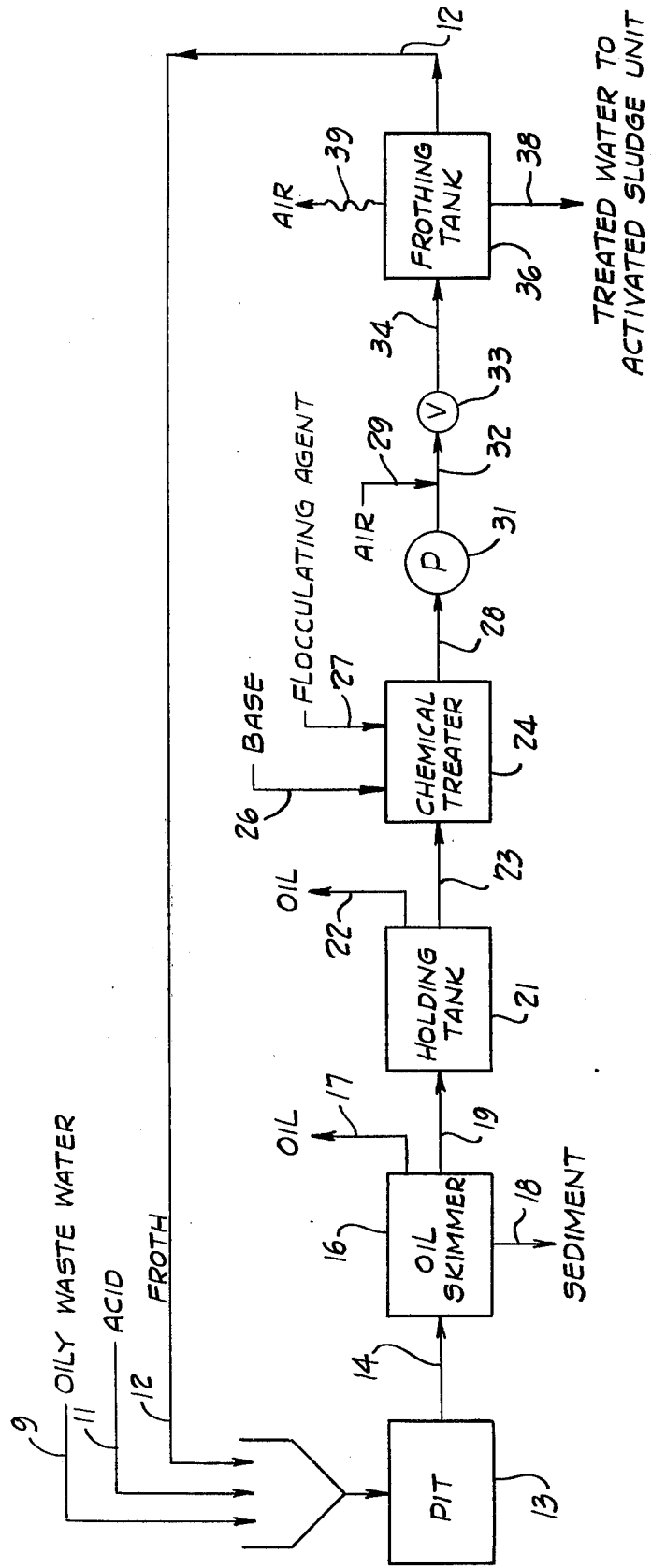

4,001,114

WASTE WATER TREATMENT PROCESS

BACKGROUND OF THE INVENTION

This invention relates to a process for treating waste water contaminated with fatty residue. Water used in processing materials or cleaning equipment for or from vegetable or animal oil refining, fat rendering, tall oil processing, etc., is a typical waste water for treatment by use of this invention. Ordinarily the concentration of the fatty residue in such waste water is quite minor, typically of the order of 5,000–20,000 ppm, although it can be even higher or lower than this.

Fatty residue herein is meant to include fatty or fat-forming substances such as $C_{4-26+}$ fatty acids, esters of such acids, especially glycerol and glycol esters, their soaps, their corresponding alcohols, and, in tall oil processing, some of the foregoing mixed with resin acids (abietic, pimaric, etc.), their soaps and/or esters. It is desirable to remove virtually all of such fatty residue from the waste water rapidly and cheaply as at least one stage of an effluent improvement scheme. Then, subsequent treatments, particularly biological ones, can be used effectively without overtaxing them.

Density separations such as with settling or skimming tanks have been used for many years for separating lighter oily phases from denser, preponderantly aqueous ones. The oil phase separation generally is quite good and sharp, but the preponderantly aqueous phase usually is still comparatively high in the fatty residues. Dissolved air flotation procedures are of more recent vintage. A permanent gas such as air (for efficiency and economy) is incorporated into the waste water under substantial pressure, then the pressure released to generate a froth. The froth is enriched in the fatty residue contaminants. Principles of this technique are described in the text, "Recent Developments in Separation Science," Volume 1, pages 113–127 (1972), edited by N. N. Li, CRC Press, Cleveland, Ohio. This disclosure is incorporated by reference in this patent application.

The instant process is especially useful in commercial operations where fairly large amounts of waste water are to be handled and treated continuously to quite a low fatty residue limit. Its advantages over prior proposals include high water throughout coupled with a high degree of fatty residue collection. In essence, the instant invention quite effectively tends to maximize the efficiency of the density separation and the dissolved air flotation techniques. The flow capacity of the dissolved air flotation unit is significantly increased by such unit's being limited to working on water that already has been submitted to density separation of some of the oily phase, and furthermore, the handling of the froth in the dissolved air flotation unit is greatly facilitated because no interfacial layer need be coped with and recycling condenses the awkward froth. The output of the previous density (skimming or the like) separation of a lighter oily phase is collected in a conventional efficient manner, eg. by decanting and/or scraping; the denser separated aqueous phase, having been rapidly treated to such "coarse" separation, need not be monitored carefully because it is given a second stage purification having a fair tolerance for more or less fatty residue still present.

BROAD STATEMENT OF THE INVENTION

The instant process comprises: mildly acidulating with acid the waste water and the recycle of froth from a subsequent step of the process; passing the resulting acidified waste water to an oil phase-aqueous phase separation zone and therein separating accumulating lighter oil phase from denser aqueous phase; adding flocculating agent and sufficient base to said denser aqueous phase for rendering pH of same at least about 6; dissolving permanent gas in the resulting alkalized aqueous phase under pressure of at least about 0.1 atmosphere gage; releasing pressure on the resulting aerated aqueous phase, thereby forming an oily froth and a stripped water product phase; and returning said froth to the foregoing acidulation step of the process.

BRIEF DESCRIPTION OF THE DRAWING

The drawing is a flow diagram showing how the invention is being used presently at a commercial vegetable oil refinery. It will be described more fully in connection with the example which follows. Instrumentation, controls, feeders, agitators, fittings, and most pumps and valves are not shown, but are to be provided where necessary or desirable in conventional fashion. Materials of construction for this process are conventional. Thus, corrosion-resistant materials such as austentic stainless steel, plastic, glass-lined steel, wood, or even clay can be used where necessary. Concrete and steel can be used where corrosion or erosion is inconsequential. Various of the tanks and lines illustrated can be in multiple, series, cascade, or parallel connected, for additional treating time or capacity.

DETAILED DESCRIPTION OF THE INVENTION

As a primary operation in the instant process the acidulation of the waste water with acid is done to "spring" fatty acids from their soaps, which tend to depress the effectiveness of the density separation. The acidulation is mild, for example, to a pH of about 3–5 and, advantageously, about 4.5–5, although lower pH can be used at the expense of acid. Strong waste acids, pickle liquor from metal pickling, or inexpensive mineral acids generally are preferred, providing they are strong enough to spring soap. Typically they will have a dissociation constant in aqueous solution of at least about $10^{-3}$. Suitable acids include sulfuric, hydrochloric, phosphoric, nitric, citric, mixtures of the foregoing and even sulfurous acid on occasion. As the acidulation reaction is rapid, it can be practiced right in the oil phase-aqueous phase density separation zone. Usually, however, it is advantageous to perform the acidulation in a prior vessel or pit wherein the waste water, froth, and acidulant are mixed apart from other operations.

The density separation of the oil phase from the acidulated aqueous phase can be best done in a skimming tank or basic or like unit, although virtually any conventional gravity separating unit such as decanter, or an accelerated gravity apparatus such as a continuous centrifuge, can be used. For practicality and high throughput rate and high capacity, continuous flow operations are preferred in every step of this process. The density separation unit also can be used to collect sediment and like solids for periodic or continuous discharge from the system.

The denser aqueous phase from the density separation operation is treated with a flocculating agent, typically an alum (aluminum sulfate), or other flocculating agent which generally is a polyelectrolyte. Other typical flocculating agents include ferrous or ferric sulfate, soda alums, and the like.

This denser separated aqueous phase is treated with a base to render the entire mixture less acidic, for example, to pH of about 6–10, advantageously about 6–8, and preferably about 7.5–8. Sufficient foam assistants are generated at pH 6 to assist dissolved air flotation operation. The minimum effective amount of the alum (aluminum sulfate) flocculating agent is required when the pH of the entire mixture is adjusted to about 6–7.8. Below pH of about 6 such alum is a relatively ineffective flocculant. At pH of about 7.8 flocculating with the alum can be done well at the expense of increased chemical usage. While the use of modest excesses of acidulating agent and/or base can be used in the practice of this invention with impunity, such practice generally represents economic waste and, therefore, preferably is avoided. Suitable inexpensive bases include caustic soda, lime, mineral calcium carbonate or oyster shell dust, soda ash, mixtures of same and the like; where ammoniacal substances such as ammonium hydroxide are available, they often can be used. The base is added to regenerate soap-like materials for enhancing the frothing in the dissolved air flotation step. Usually the base and flocculating agent both are added in a small chemical treatment tank with agitation, although the flocculation treatment can precede the base addition, and in any stage of the process a large reservoir can be used to accumulate and regulate flow, provide holding time, and provide a place for treatment if desired. It is preferred to use a holding tank prior to treating with base and flocculant (and subsequently air for the dissolved air flotation step) so that this flotation step can be fed at an approximately constant rate regardless of erratic flow of oily waste water from the factory. Constant water feed at this stage makes the subsequent operations more efficient and easier for the help to operate.

While air is preferred for efficiency and economy in the "dissolved air flotation" sludge disposal unit, other permanent gases such as nitrogen or even certain flue gases can be used when available and convenient. Air, however, can provide some useful oxygen for the water being treated and for that reason further is distinctly preferred. While the pressure for a suitable flotation operation can be as low as about 0.1 atmosphere gage, an aerating gage pressure of about 2 to 10 atmospheres is advantageous and about 40–70 psi is preferred. Conveniently such aeration can be obtained by forcing air into the alkalized water discharge from a centrifugal pump working against a flow restriction such as a back pressure control valve, orifice, or the like.

The aerated water is discharged rapidly to a much lower pressure, preferably atmospheric for economy and efficiency in a vented frothing tank. The froth tends to concentrate fatty residue and floats to the top of the tank. When such frothing tank is set at a proper elevation, the froth can be discharged by gravity directly into the acidulating operation with great simplicity. If some of the more highly aqueous interfacial layer (eg. a so-called "B.S. layer") tends to be separated with the froth, eg. by scraping, decanting, or splashing, such indelicacy will not materially affect the operation since the weight of the froth and such material relative to the weight of the feed waste water ordinarily is comparatively minute.

The water-rich underflow from the frothing tank ordinarily will contain only a few hundredths of the fatty residue originally fed to the process in the feed waste water. Customarily it is discharged from a fairly low elevation in the frothing tank, and it can be subjected to a subsequent purification treatment if necessary or desired.

Subsequent water purification treatments include activated sludge followed by clarification, activated carbon, lime, coagulation, thickening, filtration as with a sand filter, anaerobic digestion, sedimentation, etc. Various useful subsequent water purification treatments are described more fully in the Kirk-Othmer *Encyclopedia of Chemical Technology*, 2nd Edition, Vol. 22, page 116, and Supplement Volume S, page 716, Interscience Publishers, New York, New York. These disclosures are incorporated into this patent application by reference.

The first example shows how the instant invention has been applied to treating waste water from a commercial vegetable oil refinery providing a waste water flow averaging about 300 gallons per minute. Such waste water is contaminated with fatty residue which averaged about 6,181 ppm (mainly fatty acids, fatty esters, soaps of fatty acids, with some fatty alcohols) over a five month period of operation (Example 1). The system was designed to handle an average of about 5,900 ppm of fatty residue entering the process in the feed waste water. The examples should not be construed as limiting the invention. In this specification all parts are parts by weight, all percentages are weight percentages, and all temperatures are in degrees Centigrade unless otherwise expressly indicated.

EXAMPLE 1

Waste water at about 46° C. from inlet 9, 66° Be sulfuric acid from line 11, and froth from channel 12 pass into pit 13. The foam collapses and blends, and the whole flow passes through line 14 into API (American Petroleum Institute) design oil skimmer 16. Sufficient acid is added to impart pH of about 4–5 to the water in the pit. Said API skimmer has capacity of 18,000 gallons. Average residence time of the water in skimmer 16 is about 30 minutes. The less dense oily phase (constituting about 89.3% of the initial fatty residue content being admitted to the process) is skimmed as a supernatant layer off the upper part of the skimmer by a mechanical arm not shown; it passes through outlet 17 and is sold for animal nutrition. An outlet 18 near the base of the skimmer is provided for withdrawing sediment periodically as is necessary or desired.

Denser aqueous phase is withdrawn from skimmer 16 through line 19; it passes into holding tank 21 (300,000 gallons capacity). Herein it has average residence time of approximately a day, and the flow from the tank 21, while continuous, is maintained fairly constant. The function of holding tank 21 is to iron out flunctuations and shut-offs of waste water fed to the process. Holding tank 21 also acts as a secondary density separation zone wherein about 7.3% more of the fatty residue initially fed to the process is skimmed off and withdrawn from line 22 for blending with the oily phase from line 17.

The denser aqueous phase from holding tank 21 then passes through line 23 into agitated chemical treatment tank 24 (about 1,500 gallons capacity). 341.5 ppm flocculating agent (340 ppm aluminum sulfate and 1.5 ppm of anionic polymer electrolyte Nalco 676A, a trademark of Nalco Chemical Co., Chicago, Illinois) and sufficient sodium hydroxide are added to tank 24 to adjust the pH of the water therein to about 8. (For treating the denser aqueous phase from a tall oil processing operation, it is advantageous to discharge the flow from tank 24 into a holding tank, not shown, for obtaining additional time.)

Contents from chemical treating tank 24 are withdrawn through line 28 and into centrifugal pump 31, along with the flow of pressurized air (about 50 SCFH) fed through line 29 into the discharge line 32 of pump 31. Pump discharge line 32 is at about 45 psig, this being maintained by orifice (item 33). The aerated material discharges through line 34 into vented frothing tank 36. Released air is vented from the system as flow 39. Tank 36 is 3 feet in diameter by 6 feet tall and is disposed to discharge froth continuously by gravity through channel 12 directly into pit 13. Simultaneously with this, an underflow of treated water is continuously withdrawn through line 38 (approximately 300 gallons per minute). It contains about 211 ppm of fatty residue (or about 3.4% of the initial fatty residue admitted to process with waste water feed of line 9). Somewhat over 12% of the fatty residue thus originally fed is returned to the pit in the froth. The treated underflow water passes into a conventional activated sludge water treatment process for further purification.

The dissolved air flotation system comprising chemical treater 24, pump 31, orifice 33, and frothing tank 36 is a Carborundum Model 750 Dissolved Air Flotation System (Carborundum Corp., Knoxville, Tennessee).

EXAMPLE 2

When a treatment scheme similar to Example 1 operated at the same vegetable oil refinery over a 13-week period with an average throughput of only 200 gallons per minute of waste water contaminated with an average of 6,100 ppm of fatty residue, the underflow (output) of treated water contained 250 ppm of fatty residue. This indicated a residue of 4.1% in spite of the much lower water throughput.

In this alternative scheme the waste water was admitted to substantially the same process of Example 1, except that this process scheme lacked any recycle of froth whatsoever. The less dense oily phase skimmed from skimmer 16 contained about 82.8% of the residue admitted to the process and the skimmings from holding tank 21 contained about 1.6%. The froth (constituting 11.5% of the residue fed to this process) was passed into a collecting tank from where it was sent to a recovery system. This froth proved to be awkward to handle and especially difficult to pump to the recovery system. No satisfactory mechanical means were found to transport this froth.

The recovery system comprised several tanks wherein the froth collapsed for separation of a supernatant residue phase from a denser aqueous phase. This separation proved to be difficult and inefficient because a clean separation of the residue from water was not possible and was additionally hindered by a messy emulsion layer which formed. The residue phase withdrawn from the tanks was disposed of because of its inferior quality. Also, a significant amount of water was taken with the residue phase because of the emulsion taken therewith. Such water content contributed to the inefficiency and expense of this scheme, along with the residue loss, because both it and the collapsed froth had to be discarded instead of being available for sale for animal nutrition along with the residue skimmings from skimmer 16 and tank 21.

EXAMPLE 3

In operations conducted in accordance with the process of Example 1, the efficiency of fatty residue removal was tested at 300 gpm average flow rate with varying fatty residue content. The results are summarized in the following table.

TABLE

| PPM of Fatty Residue in Waste Water | PPM in Underflow of Treated Water | % Fatty Residue Remaining in Treated Water |
| --- | --- | --- |
| 2,715 | 41 | 1.5% |
| 4,780 | 130 | 2.7% |
| 7,180 | 275 | 3.8% |
| 11,030 | 520 | 4.7% |

This shows not only the efficiency of the instant process, but also its flexibility in treating more or less contaminated water effectively. In actual daily operations the plant of Example 1 has experienced flunctuations in and effectively cleansed residue content of the waste water from as low as a few hundred ppm up to 23,735 ppm.

We claim:

1. In a process for treating waste water contaminated with fatty residue wherein said waste water is subjected to density separation for removing accumulated lighter oil phase from denser aqueous phase; and said denser aqueous phase is treated with flocculating agent and sufficient base for rendering pH of same at least about 6; and the resulting treated denser aqueous phase subjected to dissolved air flotation for recovery of stripped water product phase from formed oily froth; the improvement which comprises:

mildly acidulating with acid said waste water to pH of about 3–5.5 prior to said density separation step; and permitting said oil froth collected from said dissolved air flotation step to flow by gravity into admixture with said waste water admitted to said process.

2. The process of claim 1 wherein the stripped water product phase is passed to a subsequent purification operation.

3. The process of claim 2 wherein said subsequent purification operation is treatment with activated sludge.

4. The process of claim 1 wherein the flow of said denser aqueous phase from step (b) thereof is maintained substantially constant.

* * * * *